United States Patent
Deming

[15] 3,698,244
[45] Oct. 17, 1972

[54] BELT TENSION GAUGE
[72] Inventor: Roy Deming, Royal Oak, Mich.
[73] Assignee: Kent-Moore Corporation, Warren, Mich.
[22] Filed: Dec. 17, 1970
[21] Appl. No.: 99,006

[52] U.S. Cl. ............................................. 73/144
[51] Int. Cl. ........................................... G01l 5/04
[58] Field of Search ................................ 73/144

[56] References Cited

UNITED STATES PATENTS

| | | |
|---|---|---|
| 2,592,868 | 4/1952 | Cushman ........................ 73/144 |
| 2,401,876 | 6/1946 | Marker et al. .................. 73/144 |
| 2,372,434 | 3/1945 | Krouse ........................... 73/144 |
| 1,631,143 | 6/1927 | Matthews et al. ............. 73/144 |
| 2,996,914 | 8/1961 | Delehanty ..................... 73/144 |

*Primary Examiner*—Jerry W. Myracle
*Attorney*—Burton and Parker

[57] ABSTRACT

A belt tension gauge for automotive accessory drive belts clamps a length of the belt at spaced apart locations along the belt and deflects the clamped length over a spring-loaded plunger operating a lazy hand pointer sweeping a scale face with the amount of plunger depression, when the belt is clamped, being a function of belt tension reflected by the pointer position relative to the scale.

7 Claims, 4 Drawing Figures

INVENTOR
ROY DEMING
BY
Burton & Parker
ATTORNEYS

INVENTOR
ROY DEMING
BY
Burton & Parker
ATTORNEYS

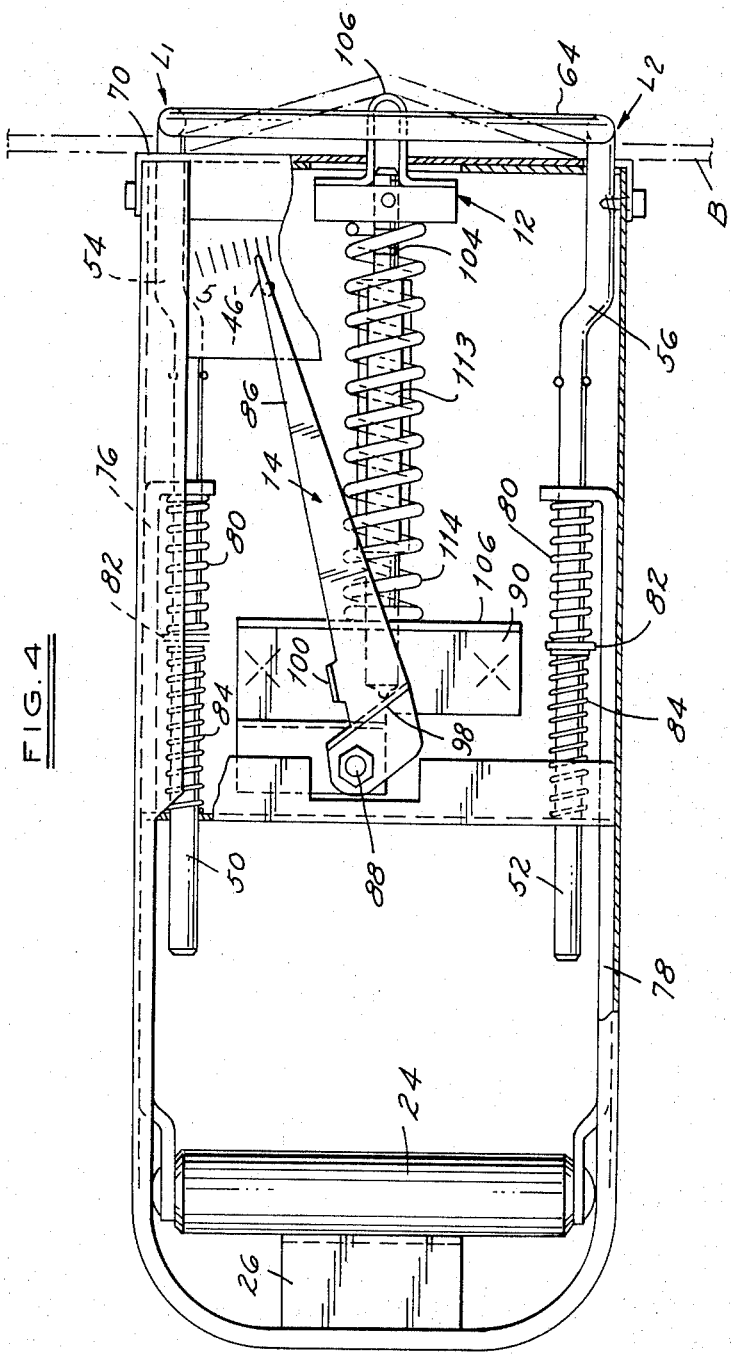

BELT TENSION GAUGE

FIELD OF INVENTION

This invention relates to a device for measuring tension, particularly the tension in automotive accessory drive belts.

BACKGROUND OF THE INVENTION

Proper tension of automotive accessory drive belts is critical not only to satisfactory operation of the accessories, but also to belt life. If a belt is too loose slippage between it and the pulleys will result in rapid belt wear and noise and the accessory being driven will not perform efficiently. If the belt is too tight, shaft bearings and seals will wear rapidly necessitating early replacement. As a consequence, servicing the modern automobile, which may have a number of drive belts for accessory units, each of which may require a different belt tension for optimum performance, requires a tensiometer for more accurately determining belt tension than the old method of plucking the belt and guessing at the tension. The automobile manufacturers prescribe the tension to which a belt is to be loaded, and this will oftentimes vary not merely from one model vehicle to another, but also depend upon whether the belt is new or used.

For a number of years applicatn's assignee has offered a belt tensiometer to the trade and in U.S. Pat. No. 2,996,914 another belt tensiometer is shown which has also been commercially available. In the area of cable tensiometers the following patents, among others, have issued: U.S. Pat. Nos. 2,013,810; 2,528,883; 2,368,757; 2,984,103; 2,403,799; 3,045,480; 2,444,245.

Quite apart from cable tensiometers used in oil and gas well drilling shown in the prior art — which would be wholly impractical for automotive belt tension gauging — the belt manufacturers, automotive manufacturers and service men have suggested various criteria for an acceptable belt tension gauge, some of the more important of which are that: the device must be easy to put on and remove from the belt in the crowded environment of the engine compartment; it must have good reading repeatability; it should be accurate with the various belt thicknesses likely to be encountered; accuracy of readings should be independent of the speed with which the instrument is applied to the belt; and the belt tension should be readable remote from the belt. These and other desirable features and design advantages are incorporated in the belt tension gauge disclosed herein.

The prior art tensiometers disclosed in the aforementioned patents operate on the principle of a three point deflection system wherein the belt or cable is first displaced by a deflecting element operating midway between and in opposition to a pair of spaced abutments to carry the belt or cable against them, and second the displacing force operating on the displacing element serves to cause the element to deflect the belt or cable out of a plane coincident with the abutments and the amount of movement of the deflecting element is utilized as a measure of the belt or cable tension. This prior art approach, though extremely simple, allows a multitude of variables in both the tensiometer itself and the cables or belts to distort or falsify the accuracy of the tension measurement. For example, variations in belt or cable thickness, stiffness and composition, and variations in internal friction in the tensiometer all adversely affect accuracy of the tension measurement. Therefore, an object of my invention is to provide a tensiometer that minimizes the influence of the aforesaid variables thus leading to greater accuracy in tension measurement.

Underlying the invention is my discovery that if the belt or cable is positively clamped at the spaced apart abutments during the tension measurement, accuracy of such measurement is substantially increased because the influence of variables in the belt or cable is minimized.

In addition, I have discovered that if the belt is positively displaced against the deflecting member and brought to bear upon control surfaces at opposite sides of the deflecting member, rather than shifting the deflecting member to displace the belt against spaced apart abutments as in the prior art, the accuracy of tension measurement is improved. This may in part arise from the fact that at the time the tension is measured with my gauge the internal friction of the gauge is at a minimum and in addition the speed with which the mechanic displaces the belt is less of a factor because the displacement is positively arrested by the belt being brought against the control surfaces.

In the gauge disclosed herein a pair of spaced apart belt engageable control surfaces are provided between which is arranged a belt deflecting element. Clamping means arranged to provide clamping surfaces on opposite sides of the deflecting element and in opposition to the control surfaces act to displace the belt against and deflect it over the deflecting element and carry the belt into clamped engagement with the control surfaces. By displacing the belt against the control surfaces and clamping it thereupon I have found that a high measure of repeatability in tension measurement reading may be obtained.

To facilitate remote reading of the tension measurement, thereby obviating the problem of the prior art gauges of trying to see the reading on the tensiometer while it remains attached to the belt in oftentimes rather inaccessible positions within the engine compartment, the tension is registered by a lazy hand pointer on the gauge which will hold its position relative to a tension scale following removal of the gauge from the belt.

In U.S. Pat. No. 2,996,914 compressive forces on the belt at the two abutments between which the deflecting element operates to deflect the belt have components which tend to make the belt more curved at such abutments as a result of the action of the belt fibers and this leads to inaccuracies in the tension measurement function. However, in my gauge, and as a result of positively clamping the belt on opposite sides of the deflecting element, the force components of the belt fibers tending to make the belt more curved are substantially reduced because the clamping tends to straighten the belt fibers thereby rendering the tension measurement more accurate.

In the case of the belt tensiometer disclosed in U.S. Pat. No. 2,996,914 springs are cocked prior to applying the gauge to the belt, and are then released under control of the mechanic during the measurement function with the result that the manner or speed with which the mechanic releases the spring loading directly affects the accuracy of the gauging function. In addition, this gauge must be held cocked by the mechanic as he "feels" for the belt to hook the gauge thereon and therefore his gripping strength is an important factor in the use of such gauge. As a consequence, it is another object of my invention to eliminate the necessity of first cocking the tensiometer before applying it to the belt, and concomitantly to provide a gauge minimizing the influence on accuracy of tension measurement arising from the mechanic's manner or speed in applying the gauge to the belt.

FIG. 4 is similar to FIG. 1 but shows the gauge clamped on a belt and the tension being measured.

Figure 1:
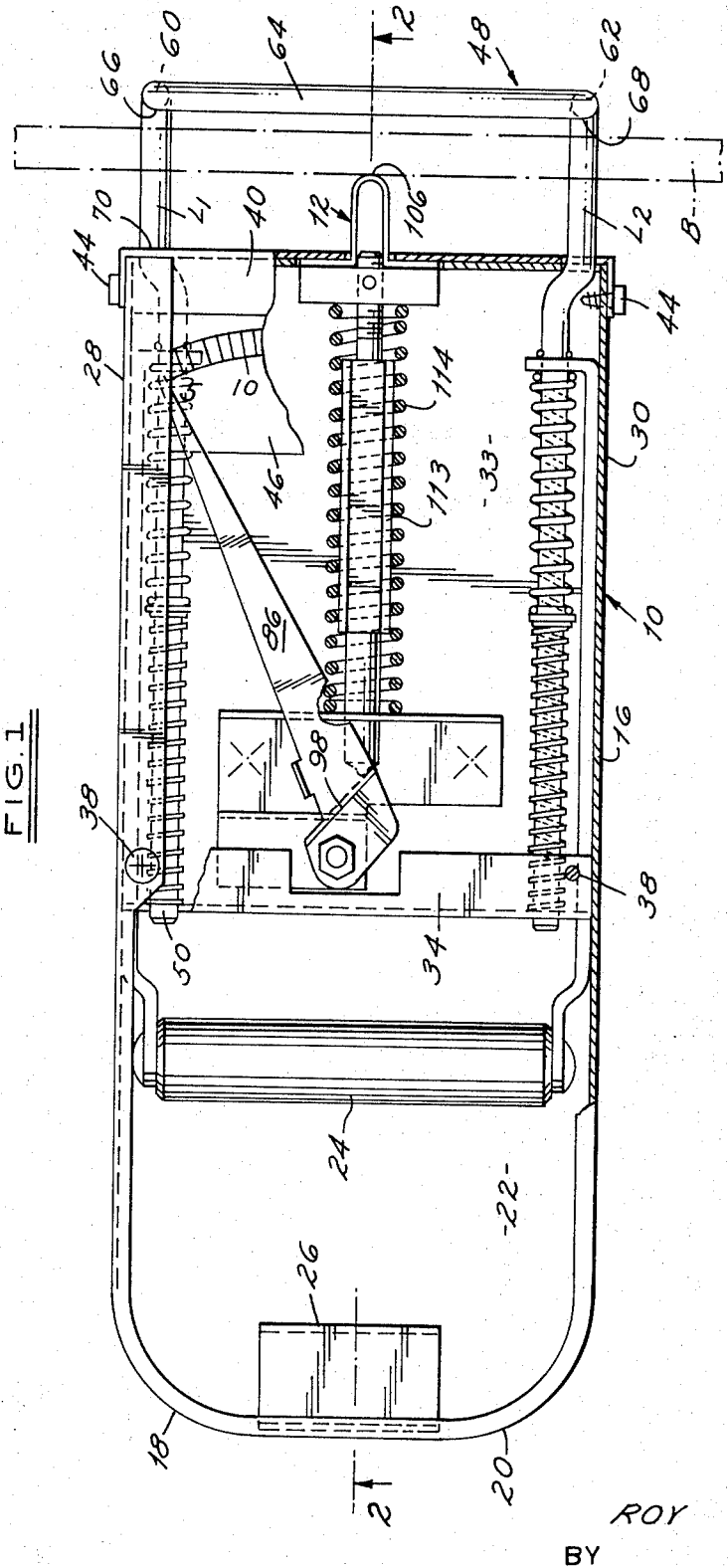
FIG. 1 is a front elevation of the gauge with the facing plate broken away to show the interior of the gauge.

As shown in the Figures, the gauge includes a frame 10 having means thereon for clamping the belt B at a pair of spaced apart locations $L_1$ and $L_2$ along the belt. There are means 12 on the frame between the locations $L_1$ and $L_2$ for deflecting the belt as shown in FIG. 4 when it is clamped at $L_1$ and $L_2$, and means 14 for indicating belt tension as a function of belt deflection.

The frame 10 includes a generally U-shaped frame member 16 of channel-like cross-section, with the bight portion 18 of the U-shape providing a handle to be grasped by the mechanic's hand with his thumb curling around one side thereof, his palm resting against the outer side 20 and his fingers extending into the opening 22. The clamping means includes a finger squeezing member 24 disposed within the opening 22 around which three or four of the mechanic's fingers may be curled so that upon squeezing his hand toward a closed position the member 24 is drawn toward the bight portion 18 to effect clamping of the belt and deflection over the deflecting means 12. A stop 26 on the inside of the handle limits movement of the squeezing member toward the bight portion for the purpose hereinafter explained. The legs 28 and 30 of the U-shaped frame member extend from the handle portion toward the opposite end of the frame and are of channel-like cross-section as mentioned above.

Received within and supported on the U-shaped frame member is a gauge subassembly which includes a body panel 32 slidably received through the open end of the U-shaped frame member and bridging between the legs 28 and 30 thereof. The body panel has a panel wall 33, opposite ends of which are bent into channel shape as at 34 and 36 and the former is secured to the frame body as by screws 38. Overlying the channel-shaped end 36 of the body panel is a channel-shaped bridge 40 which is secured to the panel wall 33 by screws 42. The bridge embraces the distal ends of the U-shaped frame member 16 and is secured to the legs 28 and 30 thereof by the screws 44. The exposed face of the channel-like end 36 of the body panel is provided with a scale 46 graduated in indicia of belt tension such as pounds of tension. When received in and secured to the U-shaped frame member 16, the body panel 32 and bridging member 40 effectively become and are part of the gauge frame 10.

The means for clamping the belt comprise, at each location $L_1$ and $L_2$ opposed cooperating belt clamping elements, one of which is a belt locating surface on the frame and the other of which is a belt clamping surface on a bail 48 which is operably connected to the squeezing member 24.

Figure 2:
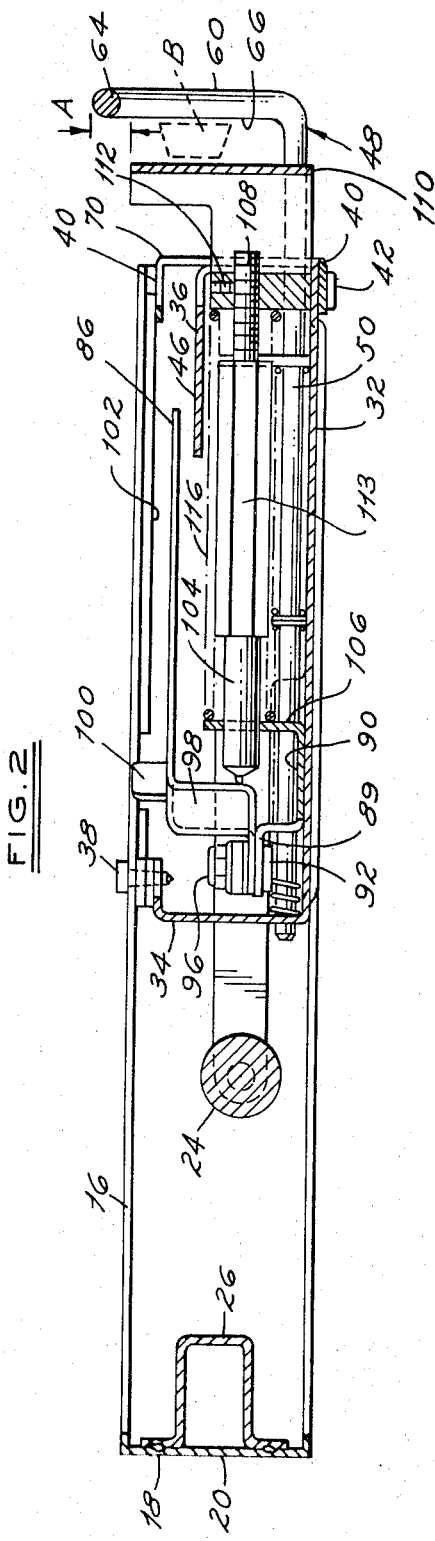
FIG. 2 is a cross-sectional view taken on line 2—2 if FIG. 1.

The bail is a generally U-shaped member having legs 50 and 52, stepped apart at 54 and 56, and bent as at 58 in FIG. 2 to provide laterally extending belt engaging portions 60 and 62 terminating in a bight portion 64. The surfaces 66 and 68 of the belt engaging portions 60 and 62 provide the aforementioned belt clamping faces or surfaces of the bail. They are directly opposed to surface portions 70 and 72 of the outwardly facing bail stop surface 74 of the bridge 40, so called because when the bail is drawn into the gauge by squeezing the member 24 toward the handle without a belt engaged between the bail and frame, the belt engaging portions of the bail will come to rest against the surface 74 before the squeezing member 24 bottoms against the stop 26, and consequently bail movement will be arrested by the bail stop surface 74.

The bail 48 is connected to the squeezing member 24 through a spring-loaded lost-motion coupling allowing the member 24 to bottom against stop 26 through movement of the bail has previously been arrested. Such coupling includes a pair of arms 76 and 78 secured at one end to the squeezing member 24 and inturned at the opposite end and slidably received over the bail legs 50 and 52. Encircling each bail leg beneath and bearing at one end against the inturned end of the associated arm is a compression spring 80, the opposite end of which bears against a spring seat 82 rigidly fastened to the bail leg. When movement of the bail is arrested, springs 80 will compress allowing continued movement of the squeezing member toward the stop 26. When the mechanic releases the squeezing member the bail is pushed outwardly to the position of FIG. 4 by the action of lightweight return springs 84 which encircle the bail arms between and bear at opposite ends against the spring seats 82 and the channel-shaped end portion 34 of the body panel. While the springs 84 will resist squeezing of the member 24 toward handle 20, they are of a low order of compression so not to appreciably offset the effective clamping force exerted by the mechanic.

The means 14 for indicating belt tension includes a lazy hand pointer 86 sweeping the scale 46 in response to the magnitude of depression of the belt deflecting element 12. The pointer is swingably mounted at 88 on an upstanding end portion 89 of a bracket 90 welded to the panel body 32. A bolt, having a head 92 overlying the bracket, extends through the bracket and pointer. Suitable washers and a nut 86 on the bolt serve to secure the pointer for swingable movement with a slight resistance to the swinging so it is somewhat less than free swinging but not of sufficient resistance to disturb gauge accuracy. The pointer has an offset cam portion 98 and a resetting tab 100 which may project through a face plate or cover 102, shown in FIG. 2, to allow the mechanic to reset the pointer to zero at commencement of tension measurement.

The belt deflecting means 12 includes a spring-loaded element 104 biased outwardly to a position disposing a belt engaging surface 106 thereof beyond a plane coincident with the belt locating surface portions 70 and 72 (in the embodiment shown such plane is the surface 74) such that upon clamping a belt by drawing the bail down to carry the belt from the phantom position shown in FIG. 1 to that shown in FIG. 4, the belt is deflected over the surface 106 and the spring-loaded member is shifted against its spring bias a distance which is a function of the belt tension. For this purpose the deflecting element 104 comprises a plunger received at one end through a guiding aperture in an upstanding portion 106 of the bracket 90 with such end bearing against the cam follower surface 98 of the pointer. The opposite end of the plunger is threaded as at 108 and a nose piece 110 is threadedly adjustably mounted thereon, a set screw 112 being provided to prevent loss of adjustment. The plunger may have flats 113 for wrench engagement to facilitate adjustment of the nose piece along the plunger threads. A constant rate compression spring 114 encircles the plunger and bears at one end against the nose piece and at the opposite end against the end portion 106 of the bracket 90. By adjusting the nose piece along the plunger the gauge may be readily calibrated at initial assembly and subsequently in the field should such become necessary.

In operation of the gauge the mechanic first sets the pointer to the zero indicia on scale 46. The gauge is then grasped in one hand by the handle as mentioned above, the fingers curled over the squeezing member 24. The gauge is then placed on the belt so that the position is substantially as shown in FIG. 1 with the gauge essentially perpendicular to the belt span embraced. The mechanic then squeezes member 24 toward the handle 20 by closing his hand until member 24 bottoms against stop 26, and then releases his grip to allow the bail to return to its starting position and removes the gauge from the belt. The belt tension is then indicated by the position of the pointer relative to the indicia of the scale. It is apparent that the magnitude of pointer swing will be a function of the magnitude of plunger depression as the belt is deflected over the nose piece.

Figure 3:
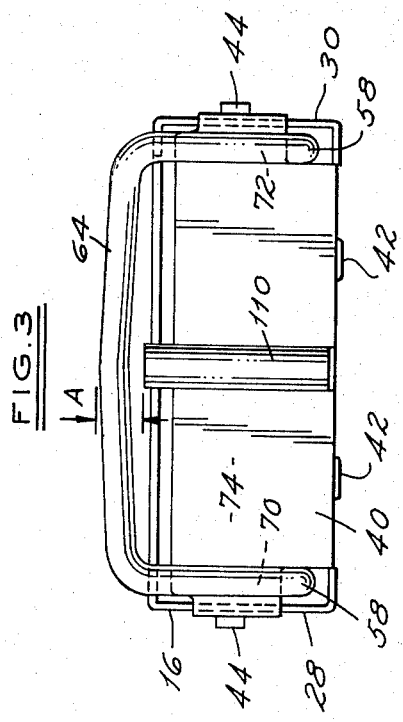
FIG. 3 is a top view looking down on the gauge in the direction of arrow 3 in FIG. 1.

It will be noted from FIGS. 2 and 3 that the bight portion 64 of the bail projects laterally beyond the front face of the gauge frame as by dimension A, and this overhang or projection facilitates the mechanic "hooking" the gauge blind onto a belt in the engine compartment.

The indicia location on the scale may be arrived at empirically as such will depend upon the rate of spring 114, the distance between the bail arms, friction in the gauge and other variables, all of which will depend upon the particular gauge design selected for embodiment of the invention.

As mentioned at the outset I have found that clamping the belt at spaced apart locations affords greater repeatability in tension measurement. This may arise because by clamping the belt at locations $L_1$ and $L_2$, the distance is more nearly constant between the points at which the belt may be taken as effectively bending during its deflection from a straight condition. The clamping action tends to confine the points of bending to the locations immediately over the nose piece and immediately under the bail portions 60 and 62. In the prior art gauges where the belt is allowed to bend unhampered in the vicinity of the elements causing the bending, the points at which the belt is effectively bending are free to vary in accordance with belt tension, thickness, stiffness and other variables. Also, by clamping the belt at $L_1$ and $L_2$ the belt fibers will tend to be straightened out, which is their normal condition, while in the prior art gauges where no clamping is involved, the compressive forces in the fibers adjacent the elements causing belt bending will tend to make the belt more curved at the points of bending and thereby introduce error in the tension measurement.

Improved accuracy in belt tension measurement is also thought to result from the recognized principle that starting friction in a system is greater than moving friction. In the gauge concept disclosed herein by virtue of the fact that once inward movement of the plunger and related tension measurement mechanism commences it continues to move in the same direction until the reaction of spring 114 balances the vector force of the belt tension when the belt is fully clamped against the locating face portions 70 and 72 on the frame. At the beginning of this movement the maximum friction force of the gauging mechanism is encountered. Once the movement has started it is continuous until stopped at the balanced condition. As a result friction in the system will be at a minimum when the actual measurement is indicated by the lazy hand pointer.

It is of interest that the strength of the mechanic's hand is divorced from the measurement function in that once he bottoms the squeezing member 24 against stop 26 the belt can be clamped no tighter. Furthermore the springs 80 will insure a substantially uniform clamping pressure on the belt each time it is clamped, and will allow accommodation of belts of varying thickness with the clamping pressure being sufficiently uniform so that the gauge readout over belts of various thickness will be uniformly accurate.

While the term belt tension gauge has been used in this specification and in the following claims, it is to be understood that applications for tension measurement of other elements than belts may be performed by the gauge and therefore the use of such term should not be considered as a limiting term.

What is claimed is:

1. A belt tension gauge comprising: a frame having a handle portion at one end defining a hand receiving opening through which the fingers of a human hand may be received with the thumb embracing the handle portion and the palm resting thereagainst, a pair of spaced apart belt locating surfaces at the opposite end of the frame, a spring-loaded element mounted on the frame and having a belt engaging portion disposed between and biased outwardly beyond said surfaces, clamping means on the frame including a finger squeezing portion disposed within said opening to be grasped by human fingers therein and squeezed toward the handle portion and further including a pair of belt clamp faces disposed in spaced opposition to the locating surfaces and movable theretoward to deflect a length of belt between said surfaces over the belt engaging portion of said element displacing the element against its spring tension and clamping the belt against the locating surfaces upon squeezing of the squeezing portion toward the handle portion, and tension indicating means on the frame responsive to shifting of said element against its spring loading to indicate tension in the deflected belt.

2. The invention defined by claim 1 characterized in that said tension indicating means includes a scale mounted on the frame and graduated in indicia of belt tension and a lazy hand pointer swingably mounted on the frame and disconnectedly coupled to the spring-loaded element to be shifted along the scale in response to depression of said element against its spring loading.

3. The invention defined by claim 1 characterized in that stop means is provided for positively limiting the squeezing motion of the squeezing portion toward the handle portion, and said clamping means includes a spring-loaded lost motion coupling between the squeezing portion and the belt clamping faces for effecting a substantially uniform clamping force on a belt when said stop means limits motion of the squeezing portion toward the handle portion.

4. The invention defined in claim 1 characterized in that spring means are provided cooperating with the clamping means and biasing the pair of belt clamping faces outwardly away from said belt locating surfaces to provide a belt receiving gap therebetween.

5. The invention defined by claim 1 characterized in that means are provided for adjusting the response of the tension indicating means to displacement of said spring-loaded element whereby the gauge may be calibrated.

6. A belt tension gauge comprising: a generally U-shaped frame providing a handle portion at the bight of the U-shape and having at the distal ends of the U-shape a pair of belt locating surfaces, a spring-loaded element mounted on the frame between the arms of the U-shape and having a belt engaging portion disposed between and biased outwardly beyond said surfaces, a generally U-shaped bail having its bight portion overlying in spaced relation, said surfaces and its leg portions extending into the frame toward the handle portion and supported by the frame, spring means disposed to urge the bight portion of the bail away from said locating surfaces, a squeezing member disposed within the handle portion of the frame and normally spaced from the bight thereof and connected through a spring-loaded lost-motion coupling to the leg portions of the bail to urge the bight portion of the bail toward said surfaces to clamp a belt therebetween, and tension indicating means on the frame connected to the spring loaded element for indicating tension as a function of movement of such element.

7. A belt tension gauge comprising: a frame having a pair of spaced apart belt locating surfaces, a spring-loaded element mounted for reciprocation on the frame perpendicular to a plane defined by said surfaces and having a belt engaging portion disposed between and biased outwardly beyond said surfaces, clamping means on the frame including a pair of belt clamping faces disposed in spaced opposition to said locating surfaces and movable theretoward to deflect a length of belt between said surfaces over the belt engaging portion of said element displacing the element against its spring tension and clamping the belt against the locating surfaces, tension indicating means on the frame responsive to shifting of said element against its spring loading to indicate belt tension, a reciprocable plunger extending between said element and the tension indicating means to transmit motion of the former to the latter, and said plunger connected to said element for axial adjustment relative thereto for calibrating the gauge.

* * * * *